United States Patent [19]
Hoshimi et al.

[11] Patent Number: 5,138,511
[45] Date of Patent: Aug. 11, 1992

[54] MAGNETIC RECORDING DISK IN WHICH THE LEVEL OF THE SURFACE OF THE DATA TRACKS, AND SERVO TRACKS IS HIGHER THAN THAT OF THE GUARDBANDS

[75] Inventors: Susumu Hoshimi; Ichiroh Saitoh, both of Kanagawa, Japan

[73] Assignee: Sony Corporation, Tokyo, Japan

[21] Appl. No.: 495,784

[22] Filed: Mar. 19, 1990

[30] Foreign Application Priority Data

Mar. 24, 1989 [JP] Japan .................. 1-072173

[51] Int. Cl.⁵ ............................ G11B 5/82; G11B 5/596
[52] U.S. Cl. ................................. 360/135; 360/77.08
[58] Field of Search .................. 360/135, 78.14, 77.11, 360/77.08, 77.07, 77.05

[56] References Cited

U.S. PATENT DOCUMENTS

| | | | |
|---|---|---|---|
| 4,513,333 | 4/1985 | Young et al. | 360/135 |
| 4,613,915 | 9/1986 | Crouse et al. | 360/135 |
| 4,642,709 | 2/1987 | Vinal | 360/135 |
| 4,805,065 | 2/1989 | Jagannathan et al. | 360/135 |
| 4,912,585 | 3/1990 | Belser et al. | 360/135 |
| 4,935,835 | 6/1990 | Godwin et al. | 360/135 |
| 4,961,123 | 10/1990 | Williams et al. | 360/135 |

*Primary Examiner*—John H. Wolff
*Assistant Examiner*—Craig A. Renner
*Attorney, Agent, or Firm*—Philip M. Shaw, Jr.

[57] ABSTRACT

A magnetic recording disk in which the level of the surface of the data tracks and servo tracks is higher than that of the guardbands.

16 Claims, 7 Drawing Sheets

MAGNETIC RECORDING DISK IN WHICH THE LEVEL OF THE SURFACE OF THE DATA TRACKS, AND SERVO TRACKS IS HIGHER THAN THAT OF THE GUARDBANDS

BACKGROUND OF THE INVENTION

1. Field of the Invention

The present invention relates to a magnetic disk for use in a magnetic disk recording and reproducing apparatus constituting a memory system of digital data or the like and, more particularly, relates to such a magnetic disk as a hard disk in which a servo signal for tracking is recorded on the disk.

2. Description of the Prior Art

There are widely used magnetic disk recording and reproducing apparatuses, adapted such that data are written in its magnetic disk and the data are read out from the magnetic disk, as external memory apparatuses attached to electronic equipment such as computers. As a magnetic disk to be used in such magnetic disk recording and reproducing apparatus, there is a hard disk, for example, made of a substrate of aluminum or the like shaped in a disk form with a hole made in the center thereof and with a recording area provided on the surface thereof as a magnetic layer spread around the center hole. In such a recording area, intelligence signal, or data signal, and servo signal necessary for tracking at the time of reading the data signal are written along a plurality of recording tracks formed, for example, in a concentric manner.

FIG. 1 shows an example of a magnetic disk hitherto proposed. Referring to the figure, a center hole 12 is made in a substrate 11, and on the surface thereof, there is provided a magnetic layer serving as a recording area 13. The recording area 13 has a plurality of recording tracks TX arranged therein in a concentric manner. Writing data signal and servo signal, which is necessary for tracking at the time of reading, along each recording track TX is performed such that a predetermined number of sectors SX are formed.

In each sector of the recording track TX, there is formed a record pattern in which a servo signal recording region RS and a data signal recording region RD are formed as shown in FIG. 2. In the data signal recording region RD, there is formed an data signal recording portion 14 in a continuous strip form, and in the servo signal recording region RS, there are formed a sync signal recording portion 15 and a servo signal providing portion 16. The servo signal providing portion 16 is formed of recorded portions A and B having two kinds of tracking servo control signals, for example, of equal frequencies recorded therein and arranged at a different distances from the sync signal recording portion 15 in the direction of the recording track TX with the boundary therebetween aligned with the centerline of the data signal recording portion 14.

At the time when the data signal is read from the data signal recording portion 14 along each recording track TX by a magnetic head, tracking servo control for the magnetic head is performed based on outputs of the tracking servo control signals, which are read by the recording head from both the recording portions A and B of the servo signal providing portion 16, and thereby, the recording head is kept in a proper tracking state with respect to the data signal recording portion 14 along each recording track TX.

When setting up a servo signal providing portion 16 in each of the sectors SX in each of a plurality of recording tracks TX provided in the recording area 13 of a magnetic disk as described above, it becomes necessary to perform recording work, called preformatting, for writing two types of tracking servo control signals into the recording portions A and B. It has so far been practiced to perform such a preformatting process for every individual magnetic disk prior to shipment of the magnetic disk apparatus. Therefore, there have been such problems that much time is required for the recording of the servo controlling signals on magnetic disks and, hence, productivity is lowered and cost of the magnetic disk apparatuses is increased.

Such problem becomes more serious as the number of tracks is increased with increase in the track density and enhancement of the storage capacity, and accordingly there has been a great demand for improving such situation.

Further, accordingly as the density of the recording tracks TX is increased, such a problem also occurs that leakage flux from the magnetic head when writing the tracking servo control signals into the recording portions A and B greatly affects the surrounding recording portions, and the outputs of the tracking control signals read by the magnetic head leak into the data signal read out from the data signal recording portion 14 in each recording track TX, thereby increasing undesired noise components therein.

In relation to such magnetic disks, there is proposed an art, in which grooves are formed between recording tracks in the recording area of a magnetic disk so that, as a result, discrete magnetic tracks in a protruded state are formed and writing and reading of signals by the magnetic head is performed on such discrete magnetic tracks is proposed in a paper, "RECORDING CHARACTERISTICS OF SUBMICRON DISCRETE MAGNETIC TRACKS", IEEE TRANSACTIONS ON MAGNETICS, vol. MAG-23, No. 5, September 1987, p. 3690–92.

OBJECTS AND SUMMARY OF THE INVENTION

An object of the present invention is to propose a novel system for writing servo signals into a magnetic disk whereby difficulties in the prior art are overcome.

Another object of the present invention is to attain effective writing of servo signals into a magnetic disk, thereby enhancing productivity of magnetic disk apparatuses.

A further object of the present invention is to enable writing and establishment of servo signals to be finished in a short time regardless of track density on a magnetic disk, thereby enhancing productivity of magnetic disk apparatuses.

A still further object of the present invention is to attain accurate reading and writing of signals without mutual interference, even when the track density on a magnetic disk is increased and the distance between the tracks is reduced.

In order to achieve the above enumerated objects, a first feature of the present invention resides in the provision of a magnetic recording disk formed of a nonmagnetic substrate and magnetic layers disposed on both sides of the substrate, the magnetic recording disk comprising a plurality of data sectors having a series of concentric data tracks on which data signal is recorded and a plurality of guardbands therebetween, and a plurality of servo sectors located between the data sectors, including in each servo sector servo tracks on which servo signal is recorded, and a plurality of guardbands therebetween, and wherein the level of surface of the magnetic layer of the data tracks and the servo tracks is higher than that of the guardbands.

The above and other objects and features of the present invention will become apparent from the following description with reference to the accompanying drawings.

DESCRIPTION OF THE PREFERRED EMBODIMENTS

Figure 1:
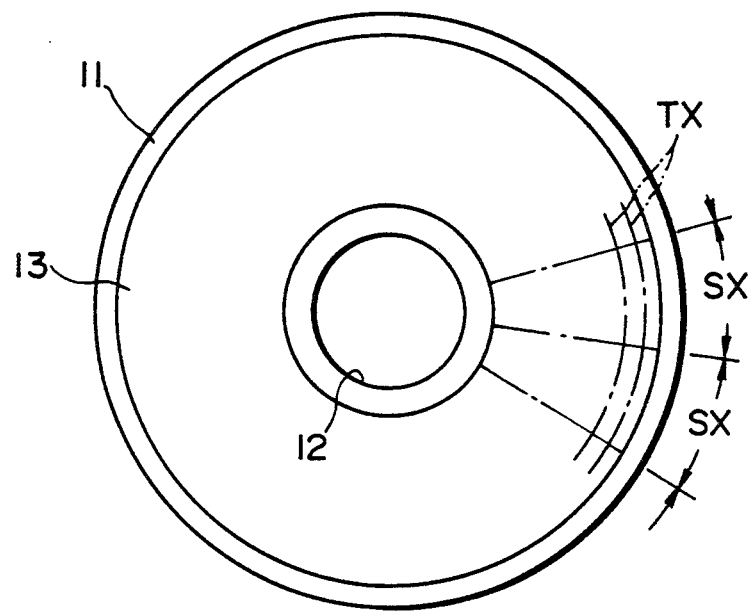
FIG. 1 is a plan view showing a prior art example of a magnetic disk.
Figure 2:
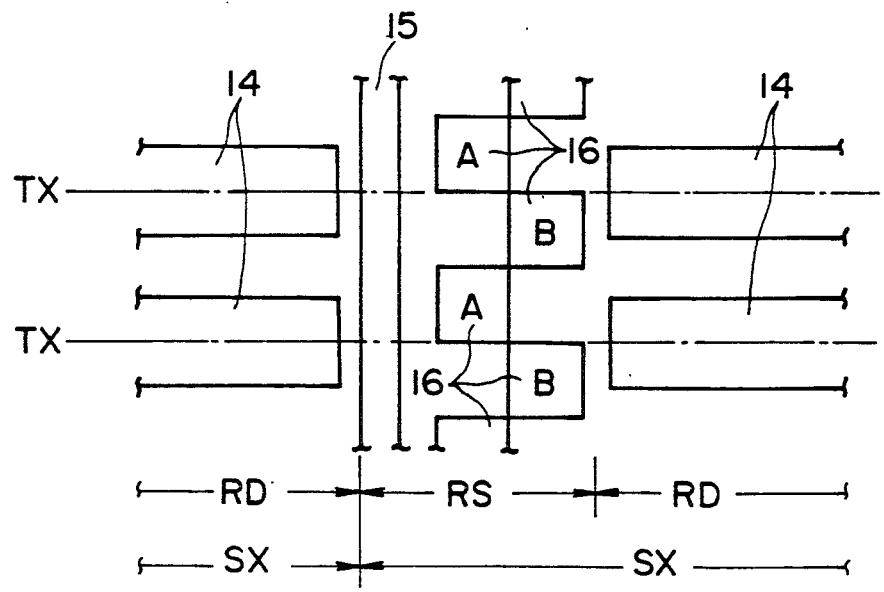
FIG. 2 is an enlarged view of a portion of FIG. 1.
Figure 3:
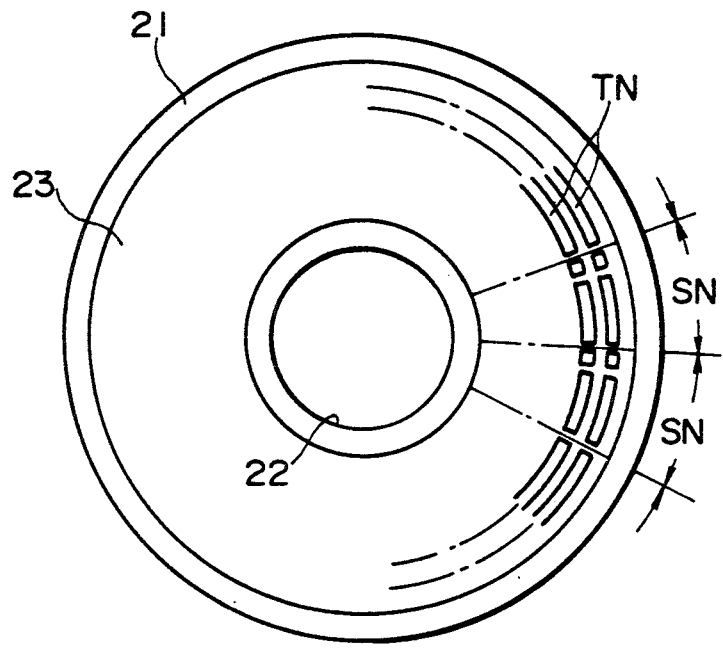
FIG. 3 is a plan view showing an example of a magnetic disk according to the present invention.

FIG. 3 shows an example of a magnetic disk according to the present invention.

In the present example, a substrate 21 is made, for example, of aluminum in a disk form and a center hole 22 is made therein. On the surface of the substrate 21 around the center hole 22, there is provided a recording area 23 formed of a magnetic layer. In the recording area 23, data signal and servo controlling signal, which is necessary for tracking at the time of reading the data signal, are written along a plurality of recording tracks TN formed around the center hole 22 in a concentric manner. The writing of the data signal along each of the recording tracks TN is performed such that a predetermined number of sectors SN are thereby sequentially formed.

Figure 4:
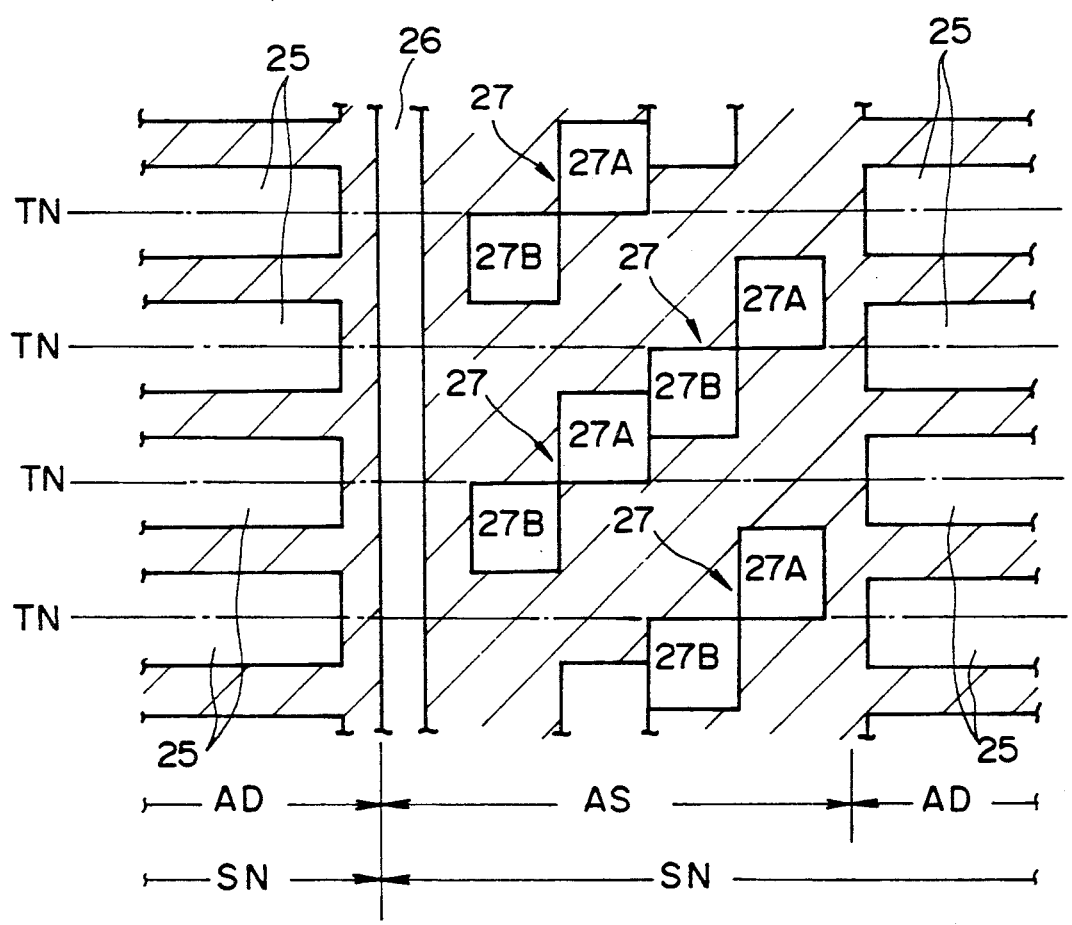
FIG. 4 is a plan view showing rectangular protrusions forming discrete data tracks and discrete servo tracks.

Each sector of the recording track TN is made up of a data signal recording region AD and a servo signal recording region AS as shown in FIG. 4. The hatched portions in FIG. 4 are where a groove portion is formed. Namely, in the data signal recording region AD, there are formed discrete data tracks 25 protruded over the hatched portion and having a magnetic layer deposited thereon. Likewise, in the servo signal recording region AS, there are formed a sync signal portion 26 and discrete servo tracks 27, which are arranged in a predetermined pattern, protruded over the hatched portion and having a magnetic layer deposited thereon.

The discrete servo track 27 is made up of rectangular protrusions 27A and 27B and arranged such that the boundary therebetween is aligned with the centerline of the discrete data track 25 formed in the data signal recording region AD and the rectangular protrusions 27A and 27B are located at different distances in the direction of the length of the track from the sync signal portion 26.

Further, the rectangular protrusions 27A and 27B for an even-numbered discrete data track and the rectangular protrusions 27A and 27B for an odd-numbered discrete data track are located at different distances from the sync signal portion 26.

The magnetic layers deposited on the sync signal portion 26 and the rectangular protrusions 27A and 27B of the discrete servo tracks 27 are provided with magnetization of a common signal applied thereto or a common signal written therein.

Figure 5:
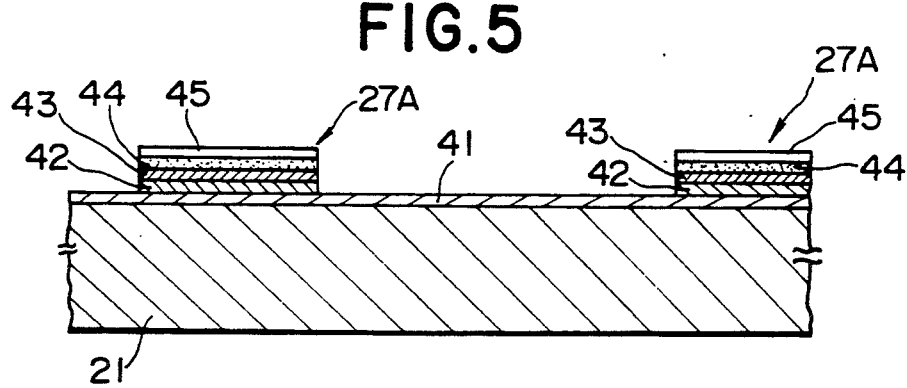
FIG. 5 and FIG. 6 are sectional views showing specific examples of discrete servo tracks.

FIG. 5 shows an example of a specific structure of the portion of a magnetic disk according to the present invention including the rectangular protrusion 27A constituting the discrete servo track 27. In the present example, on the entire surface of the recording area 23 on the substrate 21 is deposited a nickel-phosphor layer 41, for example, and on the nickel-phosphor layer 41 are locally deposited a chromium layer 42, a magnetic layer 43, a protecting layer 44 made of carbon or the like, and a lubricant layer 45 laminated in the order named, whereby the rectangular protrusion 27A is formed. In the present example, the rectangular protrusion 27B constituting the discrete servo track 27 together with the rectangular protrusion 27A, the sync signal portion 26, and the discrete data track 25 are arranged in the same structure as the rectangular protrusion 27A.

These discrete data tracks 25, sync signal portions 26, and rectangular protrusions 27A and 27B forming the discrete servo tracks 27 are provided, for example, in this way. First a nickel-phosphor layer 41, a chromium layer 42, a magnetic layer 43, a protection layer 44, and a lubricant layer 45 are deposited one above another on the entire surface of the recording area 23 of the substrate 21 so that a laminated deposit is formed on the same, then etching is applied to the laminated deposit through a mask having a pattern to shield the portions where the discrete data tracks 25, the sync signal portions 26, and the rectangular protrusions 27A and 27B constituting the discrete servo tracks 27 are formed, whereby the chromium layer 42, the magnetic layer 43, the protection layer 44, and the lubricant layer 45 at the portions that are not masked are removed, and then the mask is removed, and thereby the provision of the discrete data tracks 25, etc. is completed.

Figure 6:
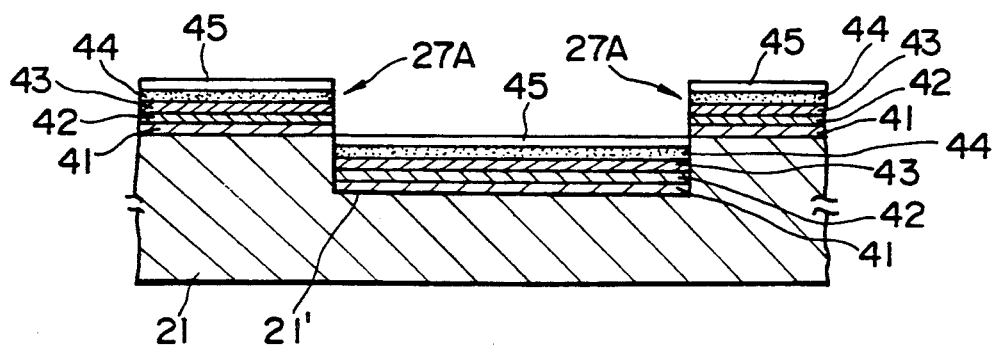

FIG. 6 shows another example of a specific structure of the portion including the rectangular protrusion 27A constituting the discrete servo track 27 in a magnetic disk according to the present invention. In the present example, a depressed portion 21' is made in the recording area 23 of the substrate 21 surrounding the portion where the rectangular protrusion 27A is formed, and as a result the portion where the rectangular protrusion 27A is formed is protruded over the depressed portion 21'. Then, on the entire surface of the recording area 23 including the depression 21' of the substrate 21 are deposited a nickel-phosphor layer 41, a chromium layer 42, a magnetic layer 43, a protection layer 44 made of carbon or the like, and a lubricant layer 45 one above another, whereby a laminated structure of the nickel-phosphor layer 41, the chromium layer 42, the magnetic layer 43, the protection layer 44, and the lubricant layer 45 is provided on the portion where the rectangular protrusion 27A is formed, and thus, the provision of the rectangular protrusion 27A is completed. In the present example, the rectangular protrusion 27B constituting the discrete servo track 27 together with the rectangular protrusion 27A, the sync signal portion 26, and the discrete data track 25 are also provided in the same structure as the rectangular protrusion 27A.

These discrete data tracks 25, sync signal portions 26, and rectangular protrusions 27A and 27B forming the discrete servo tracks 27 are provided, for example, in this way. First, etching is applied to the entire surface of the recording area 23 of the substrate 21 through a mask having a pattern to shield the portions where the discrete data tracks 25, the sync signal portions 26, and the rectangular protrusions 27A and 27B constituting the discrete servo tracks 27 are to be formed, whereby depression 21' is made in the portion other than those where the masking has been applied, and then, after removing the mask, a nickel-phosphor layer 41, a chromium layer 42, a magnetic layer 43, a protection layer 44, and a lubricant layer 45 are deposited one above another on the entire surface of the recording area 23 including the depression 21' of the substrate 21, and thus, the provision of the laminated structure is completed.

Figure 7:
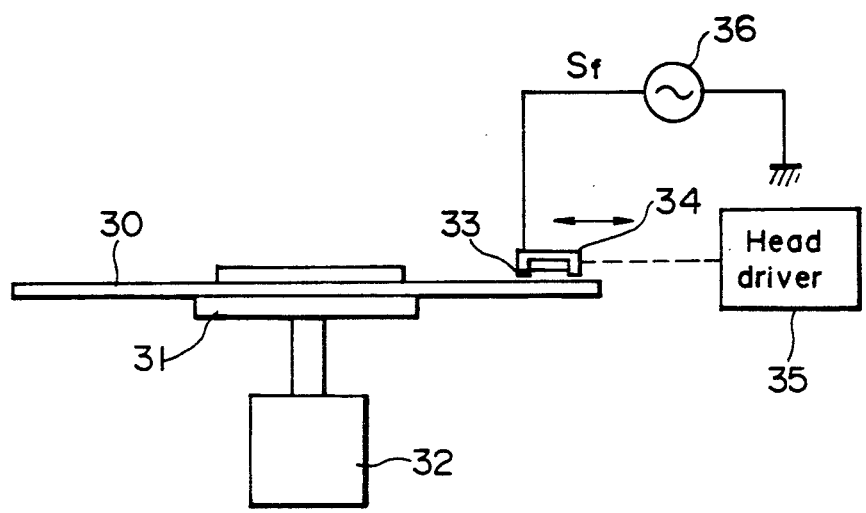
FIG. 7 and FIG. 8 are schematic diagrams showing examples of signal writing systems for preformatting.

FIG. 7 shows an example of a signal writing system for writing a common signal onto the magnetic layer deposited on the discrete data track 25, the magnetic layer deposited on the sync signal portion 26, and the magnetic layer deposited on the two rectangular protrusions 27A and 27B of the discrete servo track 27 provided as described above.

In the present example, a magnetic disk 30, of which the portion becoming the recording area 23 of the substrate 21 is provided with the discrete data tracks 25, the sync signal portions 26, and the two rectangular protrusions 27A and 27B constituting the discrete servo tracks 27, is mounted on a disk table 31 and driven by a disk driving motor 32 to rotate at a predetermined number of revolutions, for example, of 3,600 rpm. The portion becoming the recording area 23 on the substrate 21 of the magnetic disk 30 rotated as described above is confronted by a writing magnetic head 33 with a width, for example, of 1 mm or so incorporated in a head slider 34. While the head slider 34 is floated over the magnetic disk 30 slightly, by $0.2\mu$ or so, for example, and shifted in the radial direction of the magnetic disk 30 by a head driver 35, a write signal Sf having a predetermined frequency of, for example, 1.2 MHz from a signal source 36 is supplied to the writing magnetic head 33. As a result, the write signal Sf is written as a common signal onto all the magnetic layers deposited on the discrete data tracks 25, the magnetic layers deposited on the sync signal portions 26, and the magnetic layers deposited on the two rectangular protrusions 27A and 27B constituting the discrete servo tracks 27 provided in the portion becoming the recording area 23 on the substrate 21 of the magnetic disk 30.

If now it is assumed that the track density is 1500 tracks/inch, for example, namely, the track pitch is $17\mu$ or so, then a writing magnetic head having a width of 1 mm can write in the signal for 60 tracks or so of the discrete servo tracks 27 at a time.

Therefore, with the described arrangement, the preformatting to write in the servo signal all over the recording area 23 can be completed in a relatively short time.

Figure 8:
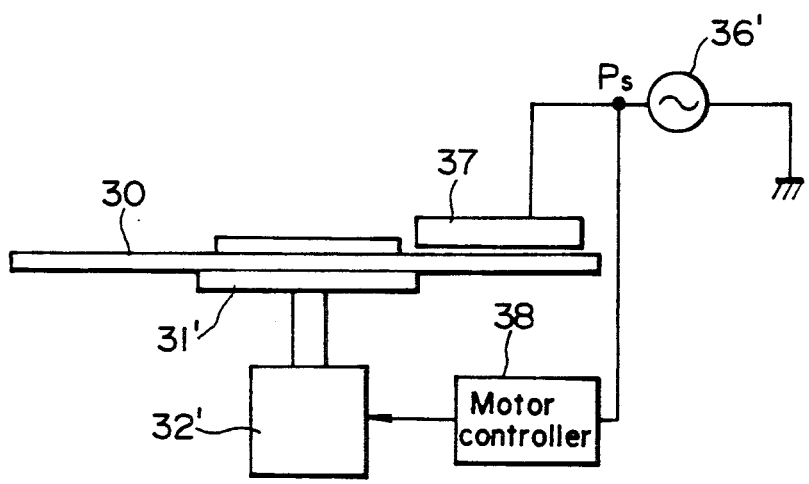

FIG. 8 shows an example of preformatting in which a wider writing head is used so that the writing of the common signal onto all the magnetic layers is completed at a time.

Also in the present example, a magnetic disk 30, of which the portion becoming the recording area 23 on the substrate 21 is provided with the discrete data tracks 25, the sync signal portions 26, and the two rectangular protrusions 27A and 27B constituting the discrete servo tracks 27, is mounted on a disk table 31' and driven by a disk driving motor 32' to rotate. The recording area 23 on the substrate 21 of the magnetic disk 30 rotated as described above is confronted by a slender writing magnetic head 37 extended in the radial direction of the magnetic disk 30 from the inner circumferential portion to the outer circumferential portion of the recording area 23. With such a writing head having a head width as large as several centimeters, the frequency characteristic becomes worse in a higher frequency range and it becomes difficult to use a high frequency write signal of 1.2 MHz or so as used in the example of FIG. 7, and thus, use of a very expensive writing head becomes an indispensable condition. Therefore, the disk drive motor 32' is rotated at a low speed, for example, of 36 rpm or so and the slender writing head 37 is supplied with a writing signal Ps generated by the signal source 36' at a relatively low frequency, for example, of 12 kHz or so.

As a result, the write signal Ps is written at a time as a common signal onto all the magnetic layers deposited on the discrete data tracks 25, the magnetic layers deposited on the sync signal portions 26, and the magnetic layers deposited on the two rectangular protrusions 27A and 27B constituting the discrete servo tracks 27 provided in the portion becoming the recording area 23 on the substrate 21 of the magnetic disk 30. In the present example, the write signal Ps from the signal source 36' is also supplied to the motor controller 38, and the motor controller 38 performs control so that the rotation of the disk driving motor 32' is synchronized with the write signal Ps.

In the present example, since the write signal Ps is set to have a relatively low frequency, the slender magnetic head 37 can be fabricated with a magnetic material obtainable at a relatively low cost, and, in addition, the writing of the signal Ps onto the magnetic layers deposited on the discrete data tracks 25, the magnetic layers deposited on the sync signal portions 26, and the magnetic layers deposited on the two rectangular protrusions 27A and 27B constituting the discrete servo tracks 27 can be performed very easily at a time.

Figure 9:
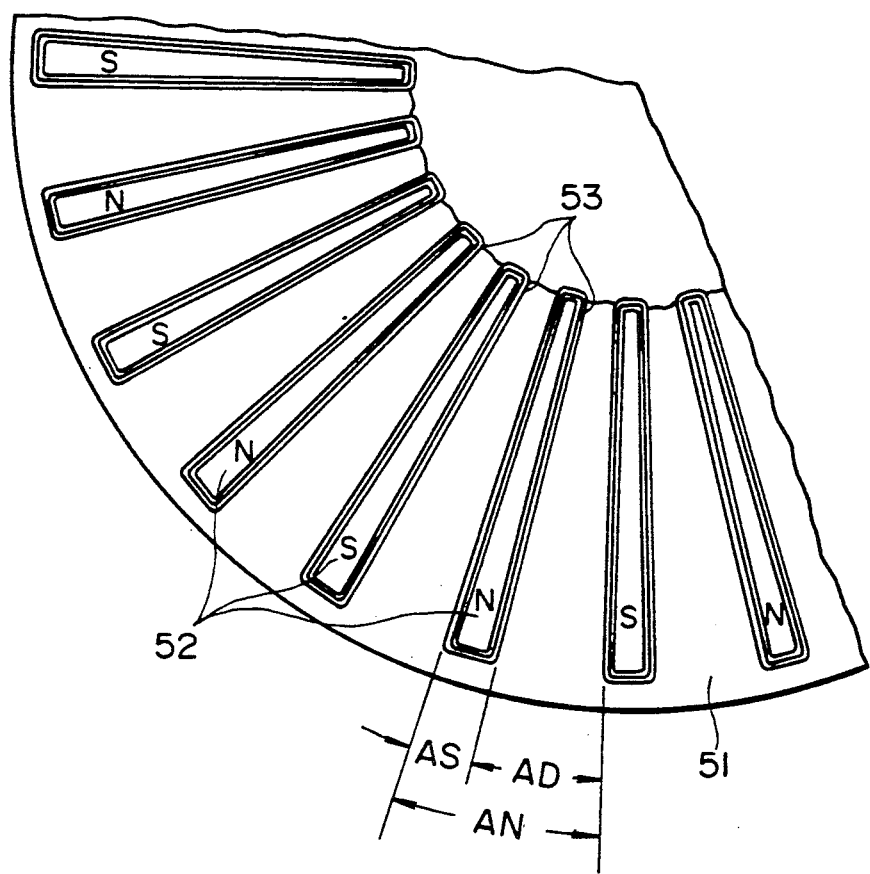
FIG. 9 is a plan view showing an example of a magnetizing system.

FIG. 9 shows a magnetizing head for use in a magnetizing system to provide magnetism of a common signal to the magnetic layers deposited on the discrete data tracks 25, the magnetic layers deposited on the sync signal portions 26, and the magnetic layers deposited on the two rectangular protrusions 27A and 27B constituting the discrete servo tracks 27 provided in the recording area 23 on the substrate 21.

The magnetizing head shown in FIG. 9 has an annular planar portion 51 having a size corresponding to the recording area 23 on the substrate 21, and in the annular planar portion 51, there are formed magnetic pole portions 52 in the radial directions each thereof having a confronting surface portion corresponding to the servo signal recording region AS in each of the sectors AN of the recording tracks TN. The magnetic pole portions 52 are wound by coils of wire 53 such that magnetic pole portions 52 alternately become N pole and S pole. Then, by arranging the magnetizing head such that the confronting surface portion of each magnetic pole portion 52 confronts servo signal recording regions AS radially disposed on the recording area 23 and passing a predetermined amount of D.C. current through the coils 53, the magnetic layers deposited on the sync signal portions 26 and the magnetic layers deposited on the two rectangular protrusions 27A and 27B constituting the discrete servo tracks 27 in the sectors AN in the recording area 23 are direct-current-magnetized according to the directions of the D.C. current passed through the coils 53, such that the direction of the magnetization is the same for the sync signal portion 26 and the two rectangular protrusions 27A and 27B constituting the discrete servo tracks 27 within the same sector, while the directions of the magnetization are reversed in alternate sectors. In the embodiment of FIG. 9, the directions of the magnetic fields generated by the coils 53 are arranged to be perpendicular to the magnetic disk, but the directions of the magnetic fields may be arranged to be in parallel with the magnetic disk. When the magnetic layer on the substrate 21 is formed of a thin film, the direction of the magnetization of the magnetic layer becomes parallel to the surface of the magnetic disk even if the directions of the D.C. magnetic field are perpendicular to the magnetic disk.

Other embodiments of magnetic disks according to the present invention will be described below with reference to FIG. 10 and FIG. 11.

Figure 10:
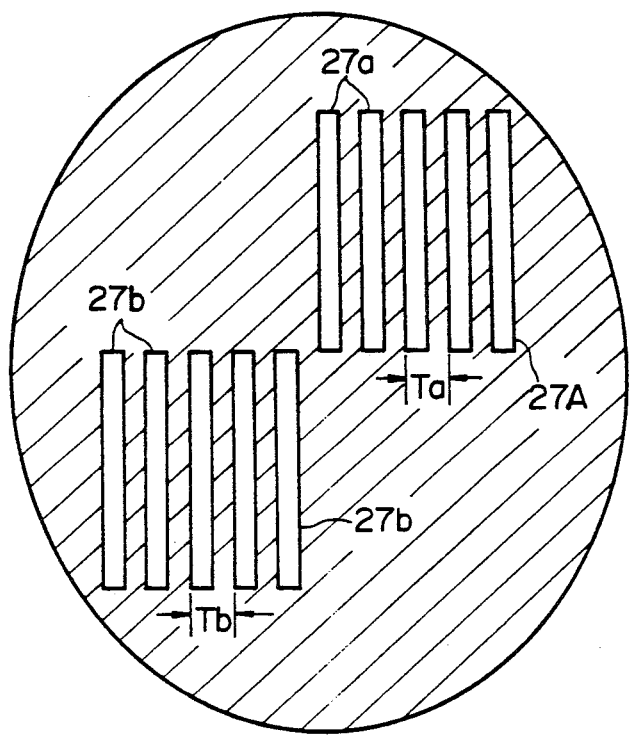
FIG. 10 and FIG. 11 are explanatory drawings of variations of embodiment having a discrete servo track formed in sub rectangular protrusions.
Figures 12A, 12B, 12C:
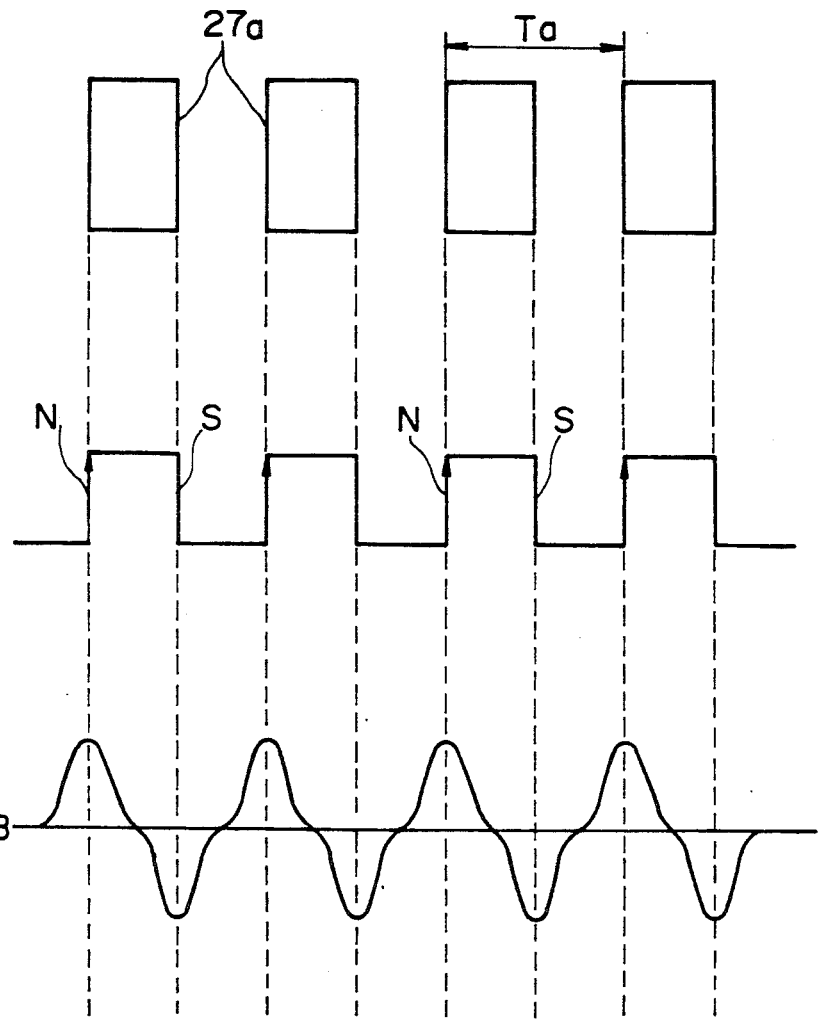
FIGS. 12A, 12B, and 12C are diagrams respectively showing magnetic layers of sub rectangular protrusions, magnetized state therein, and reproduced signal therefrom.

FIG. 10 is an enlarged view showing the rectangular protrusions 27A and 27B constituting the discrete servo track 27 shown in FIG. 4. The rectangular protrusions 27A and 27B here are respectively formed of thinner sub rectangular protrusions 27a and 27b, with their respective pitch Ta and pitch Tb arranged to be equal with each other. FIG. 12 shows a magnetized state when the rectangular protrusion 27A or 27B made up of thinner rectangular protrusions 27a or 27b is direct-current-magnetized, namely, FIG. 12A shows magnetic layers of the sub rectangular protrusions 27a arranged with a pitch Ta, FIG. 12B shows a magnetized state of the layers, and FIG. 12C shows the reproduced output SPB obtained when the magnetized layers are reproduced by a reproducing head. The frequency of the reproduced output SPB is determined by the pitch Ta or Tb of the sub rectangular protrusions 27a or 27b.

Figure 11:
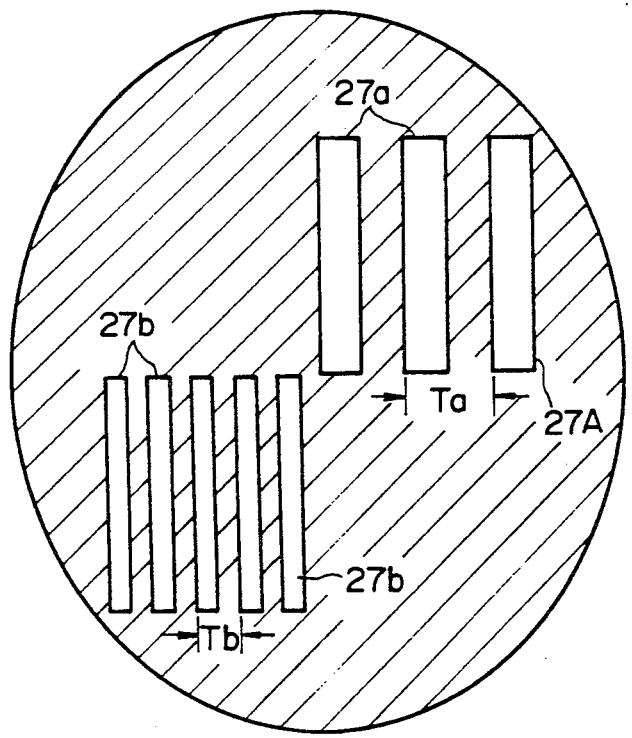

FIG. 11 shows the case where the ratio between the pitch Ta and pitch Tb of the sub rectangular protrusions 27a and 27b of the rectangular protrusions 27A and 27B are arranged to be 2:1. When such a pattern is reproduced, the ratio between the frequencies obtained from the rectangular protrusions becomes 1:2. Hence, these signals can be separated by providing two band-pass filters having suitable passbands, without the need for providing the sync signal portion 26, and tracking control the same as described above can be performed by comparing the levels of these signals.

As described in the foregoing, each of the portions of the discrete servo track 27, i.e., of the two rectangular protrusions 27A and 27B as the constituents thereof, is formed in the recording area 23 on the magnetic disk as a protrusion and provided with a magnetic layer deposited thereon, which is provided with magnetization of a common signal applied thereto or a common signal written thereon. When these two portions are scanned by the reading magnetic head, if the reading magnetic head is in a proper tracking state with respect to the recording track, it is detected that the output read from the rectangular protrusion 27A and the output read from the rectangular protrusion 27B by the reading magnetic head are at the same level. If there occurs erroneous tracking such that the reading magnetic head is shifted toward the side of the rectangular protrusion 27A with respect to the recording track, it is detected that the level of the output read from the rectangular protrusion 27A is higher than the level of the output read from the rectangular protrusion 27B. In contrast, if there occurs such erroneous tracking that the reading magnetic head is shifted toward the side of the rectangular protrusion 27B with respect to the recording track, it is detected that the level of the output read from the rectangular protrusion 27B is higher than the level of the output read from the rectangular protrusion 27A. Thus, tracking servo control for the reading magnetic head is performed by maintaining the output read from the rectangular protrusion 27A and the output read from the rectangualr protrusion 27B by the reading magnetic head at equal level at all times.

What is claimed is:

1. A magnetic recording disk comprising a nonmagnetic substrate and a magnetic layer on at least one side of the substrate, the magnetic recording disk comprising:
   a plurality of data sectors having a series of concentric data tracks on which a data signal is recorded, and a plurality of guardbands between the data tracks; and
   a plurality of servo sectors located between the data sectors, each of the servo sectors including servo tracks on which a servo signal is recorded, and a plurality of guardbands between the servo tracks,
   wherein a planar surface formed by the magnetic layer of the data tracks and by the magnetic layer of the servo tracks is higher than that of the guardbands with respect to the substrate.

2. A magnetic recording disk according to claim 1, wherein the servo sectors include for each of the data tracks at least two types of the servo tracks, one type of which is on one side of a centerline of the data track and the other type of which is on the other side of the centerline.

3. A magnetic recording disk according to claim 2, wherein the position of the one type of the servo tracks is different from that of the other type of the servo tracks in the direction of the track length.

4. A magnetic recording disk according to claim 2, wherein the servo tracks have an alternate pattern of different heights above a planar surface formed by the nonmagnetic substrate in predetermined frequencies.

5. A magnetic recording disk according to claim 4, wherein the frequency of the alternate pattern in the one type of the servo tracks is different from that of the other type of the servo tracks.

6. A method of writing a servo signal on a magnetic recording disk comprising a nonmagnetic substrate and a magnetic layer on at least one side of the nonmagnetic substrate, the method comprising steps of:
   providing a plurality of data sectors having a series of concentric data tracks on which a data signal is recorded and a plurality of guardbands between the data tracks, wherein a planar surface formed by of the magnetic layer of the data tracks is higher than that of the guardbands with respect to the substrate;
   providing a plurality of servo sectors located between the data sectors, each of the servo sectors including servo tracks on which the servo signal is recorded, and a plurality of guardbands between the servo tracks, wherein a planar surface of the magnetic layer of the servo tracks is higher than that of the guardbands with respect to the substrate; and magnetizing the magnetic layer at least on the servo sectors to have a constant polarity.

7. A method of writing a servo signal on a magnetic recording disk comprising a nonmagnetic substrate and a magnetic layer on at least one side of the nonmagnetic substrate, the method comprising steps of:

providing a plurality of data sectors having a series of concentric data tracks at a given track pitch on which a data signal is recorded, and a plurality of guardbands between the data tracks, wherein a planar surface formed by the magnetic layer of the data tracks is higher than that of the guardbands with respect to the substrate;

providing a plurality of servo sectors located between the data sectors, each of the servo sectors including servo tracks on which the servo signal is recorded, and a plurality of guardbands between the servo tracks, wherein a planar surface formed by the magnetic layer of the servo tracks is higher than that of the guardbands with respect to the substrate; and recording a predetermined frequency signal at least on the servo sectors by a magnetic head having a recording gap length which is longer than the track pitch of the data tracks.

8. A method of writing a servo signal on a magnetic recording disk according to claim 7, wherein the step of recording the predetermined frequency signal at least on the servo sectors comprises recording the predetermined frequency signal using the magnetic head wherein the recording gap length of the magnetic head is a predetermined multiple of the track pitch of the data tracks.

9. A method of writing a servo signal on a magnetic recording disk comprising a nonmagnetic substrate and a magnetic layer on at least one side of the nonmagnetic substrate, the method comprising steps of:

providing a plurality of data sectors having a series of concentric data tracks at a predetermined track pitch on which a data signal is recorded, and a plurality of guardbands between the data tracks;

providing a plurality of servo sectors located between the data sectors, each of the servo sectors including servo tracks on which the servo signal is recorded, and a plurality of guardbands between the servo tracks;

providing the magnetic layer only on portions of the nonmagnetic substrate corresponding to the data tracks and the servo tracks; and recording a predetermined frequency signal at least on the servo sectors by a magnetic head having a recording gap length which is longer than the track pitch of the data tracks.

10. A method of writing a servo signal on a magnetic recording disk according to claim 9, wherein the step of recording the predetermined frequency signal at least on the servo sectors comprises recording the predetermined frequency signal using the magnetic head wherein the recording gap length which is a predetermined multiple of the track pitch of the data tracks.

11. A magnetic recording disk comprising a nonmagnetic substrate and a magnetic layer on at least one side of the substrate, the magnetic recording disk comprising:

a plurality of data sectors having a series of concentric data tracks on which a data signal is recorded and a plurality of guardbands between the data tracks; and a plurality of servo sectors located between the data sectors, each of the servo sectors including servo tracks on which a servo signal is recorded, and a plurality of guardbands between the servo tracks;

wherein the magnetic layer is provided only on portions of the nonmagnetic substrate corresponding to the data tracks and the servo tracks, but not provided on portions of the nonmagnetic substrate corresponding to the guardbands; and wherein each of the servo tracks includes a pair of rectangular portions of magnetic and nonmagnetic materials which are each formed of repeated narrower rectangular portions of magnetic and nonmagnetic materials, the pair of rectangular portions of magnetic and nonmagnetic materials being radially offset and spaced apart from each other in the circumferential direction of the disk, and the repeated narrower rectangular portions of magnetic and nonmagnetic materials also being spaced apart from each other in the circumferential direction of the disk.

12. A magnetic recording disk according to claim 11, wherein the spacing between the repeated narrower rectangular portions of magnetic and nonmagnetic materials of one of the pair of rectangular portions of magnetic and nonmagnetic materials has a first predetermined pitch and the spacing between the repeated narrower rectangular portions of magnetic and nonmagnetic materials of the other of the pair of rectangular portions of magnetic and nonmagnetic materials has a second predetermined pitch which is different than the first predetermined pitch.

13. A magnetic recording disk according to claim 11, wherein the width, taken in the circumferential direction of the disk, of the repeated narrower rectangular portions of magnetic and nonmagnetic materials of one of the pair of rectangular portions of magnetic and nonmagnetic materials is greater than the corresponding width of the repeated narrower rectangular portions of magnetic and nonmagnetic materials of the other of the pair of rectangular portions of magnetic and nonmagnetic materials.

14. A method of writing a servo signal on a recording disk comprising a nonmagnetic substrate and a magnetic layer on at least one side of the substrate, the method comprising steps of:

providing a plurality of data sectors having a series of concentric data tracks on which a data signal is recorded and a plurality of guardbands between the data tracks; and providing a plurality of servo sectors located between the data sectors, each of the servo sectors including servo tracks on which the servo signal is recorded, and a plurality of guardbands between the servo tracks;

wherein the magnetic layer is provided only on portions of the nonmagnetic substrate corresponding to the data tracks and the servo tracks, but not provided on portions of the nonmagnetic substrate corresponding to the guardbands; and wherein each of the servo tracks includes a pair of rectangular portions of magnetic and nonmagnetic materials which are each formed of repeated narrower rectangular portions of magnetic and nonmagnetic materials, the pair of rectangular portions of magnetic and nonmagnetic materials being radially offset and spaced apart from each other in the circumferential direction of the disk, and the repeated narrower rectangular portions of magnetic and nonmagnetic materials also being spaced apart from each other in the circumferential direction of the disk.

15. A method of writing a servo signal on a recording disk according to claim 14, wherein the step of providing the servo tracks includes the step of spacing apart the repeated narrower rectangular portions of magnetic and nonmagnetic materials of one of the pair of rectangular portions of magnetic and nonmagnetic materials to have a first predetermined pitch and spacing apart the repeated narrower rectangular portions of magnetic and nonmagnetic materials of the other of the pair of rectangular portions of magnetic and nonmagnetic materials to have a second predetermined pitch which is different than the first predetermined pitch.

16. A method of writing a servo signal on a recording disk according to claim 14, wherein the step of providing the servo tracks includes the step of forming the width, taken in the circumferential direction of the disk, of the repeated narrower rectangular portions of magnetic and nonmagnetic materials of one of the pair of rectangular portions of magnetic and nonmagnetic materials to be greater than the corresponding width of the repeated narrower rectangular portions of magnetic and nonmagnetic materials of the other of the pair of rectangular portions of magnetic and nonmagnetic materials.

* * * * *